(12) United States Patent
Seibold

(10) Patent No.: US 6,409,263 B1
(45) Date of Patent: Jun. 25, 2002

(54) DUMP LATCH WITH DEFORMABLE LOCK

(75) Inventor: Kurt A. Seibold, South Lyon, MI (US)

(73) Assignee: Johnson Controls Technology Company, Plymouth, MI (US)

( * ) Notice: Subject to any disclaimer, the term of this patent is extended or adjusted under 35 U.S.C. 154(b) by 0 days.

(21) Appl. No.: 09/487,369

(22) Filed: Jan. 18, 2000

(51) Int. Cl.⁷ ................................................ B60N 2/42
(52) U.S. Cl. .............................. 297/216.13; 297/378.11
(58) Field of Search ........................... 297/216.13, 353, 297/216.14, 378.11, 378.12

(56) References Cited

U.S. PATENT DOCUMENTS

| | | |
|---|---|---|
| 2,732,003 A | 1/1956 | Williams |
| 3,501,200 A | 3/1970 | Ohta |
| 4,103,967 A * | 8/1978 | Tanaka et al. ......... 297/378.11 |
| 4,358,155 A * | 11/1982 | Osterhold et al. ..... 297/378.11 |
| 4,365,838 A * | 12/1982 | Berg ...................... 297/378.11 |
| 4,366,984 A * | 1/1983 | Klueting et al. ....... 297/378.11 |
| 5,507,555 A | 4/1996 | Kiguchi |
| 5,664,838 A | 9/1997 | Baloche |
| 5,690,386 A | 11/1997 | Chabanne |
| 5,842,744 A * | 12/1998 | Harmon ............. 297/216.13 X |
| 5,882,080 A | 3/1999 | Houghtaling et al. |
| 5,951,108 A * | 9/1999 | Bauer et al. ......... 297/378.1 X |
| 6,109,690 A * | 8/2000 | Wu et al. ........... 297/216.14 X |

* cited by examiner

Primary Examiner—Peter M. Cuomo
Assistant Examiner—Stephen Vu
(74) Attorney, Agent, or Firm—Foley & Lardner

(57) ABSTRACT

A seat assembly including a seat back operable to be displaced between a seat forming position and a stowed position, and a latch mechanism providing support for the seat back, the latch mechanism including a support member having an engagement surface and a base plate having a stop and a buckle zone, the buckle zone able to deflect under a force such that the engagement surface contacts the stop.

12 Claims, 3 Drawing Sheets

DUMP LATCH WITH DEFORMABLE LOCK

BACKGROUND OF THE INVENTION

The present invention relates to a seat assembly having a seat cushion and a seat back with a latch mechanism. More specifically, the present invention relates to a seat latch mechanism which deforms, deflects, or compresses to absorb energy during a collision.

Many vehicles are provided with sophisticated seat assemblies that may be folded or collapsed when moved to a stowed position from a use or seat forming position. A large percentage of vehicles in present use have a folding seat back which pivots and folds onto the seat cushion to create a storage surface and allows access to the rear of the seat assembly. These folding and pivoting seat backs have further been adapted to include an integral seat belt such as a three point restraint. During a collision or rapid deceleration, a folding or forward tilting seat back having an integral seat belt will be subject to large inertial loads from both the mass of the occupant, transferred through the seat belt, and the mass of the seat back. The inertial load in many instances of such rapid deceleration will be significant and will place a large load onto a latch mechanism that fixes the seat back to the frame of the vehicle. Accordingly, there is a need in the art for a latch mechanism which can absorb the energy of a large inertial load and still maintain the structural integrity of a seat assembly.

It is an object of the present invention to attenuate the energy from a collision or rapid deceleration in a vehicle by employing an energy damping mechanism and an inertial lock for a seat back.

A further object of the present invention is to maintain the structural integrity for a seat assembly, during a collision or rapid deceleration, to generally maintain the upright position of a seat occupant in the seat assembly.

SUMMARY OF THE INVENTION

In accordance with the present invention, a vehicle seat assembly is provided with a latch mechanism for latching and unlatching the seat assembly in a use or seat forming position. The seat assembly in the preferred embodiment includes a pivotable seat back. A first pivoting mechanism supports the seat back and allows the seat back to be pivoted between a generally horizontal position folded upon a seat cushion and a generally vertical use position. The latch mechanism latches the seat back in response to the movement of the seat back from its stowed position to its seat forming position.

The latch mechanism of the present invention includes a sector support, a base plate or flange member attached to the vehicle floor, and a rotatable cam or catch for latching or releasing the seat back. The seat back in the preferred embodiment is coupled to the sector support which is further pivotably coupled to the base plate. The sector support includes an engagement surface which has been designed to mate with a stop on the base plate when a buckle zone on the base plate compresses or deflects under an external force. When an external force vector of sufficient magnitude is applied to the sector support (for example the force generated by a frontal collision), the buckle zone will compress or deflect to absorb the energy of the force. The deflection of the buckle zone will bring the engagement surface of the sector support into contact with the stop located on the base plate, and at the same time absorb the energy of the external force. The stop will prevent further motion of the seat back in a forward direction, maintaining an occupant on the seat assembly in a generally normal vertical position.

Furthermore, the engagement surface of the sector support has been configured with a profiled engagement surface. The profiled engagement surface has been shaped to guide and mate with the stop to create a snug or firm fit, stopping the movement of the sector support during the deflection of the buckle zone.

BRIEF DESCRIPTION OF THE DRAWINGS

The various advantages of the present invention will become apparent to those skilled in the art after reading the following specification and by reference to the drawings, in which.

DETAILED DESCRIPTION OF THE PREFERRED EMBODIMENT(S)

The following description of the present invention is merely exemplary in nature and is in no way intended to limit the invention or its uses. Moreover, the following description, while depicting a latch mechanism designed to operate with automotive seats having a folding seat back, is intended to adequately teach one skilled in the art to make and use the latch mechanism of the present invention with any type of seat system to which it may be adapted.

Figure 1:
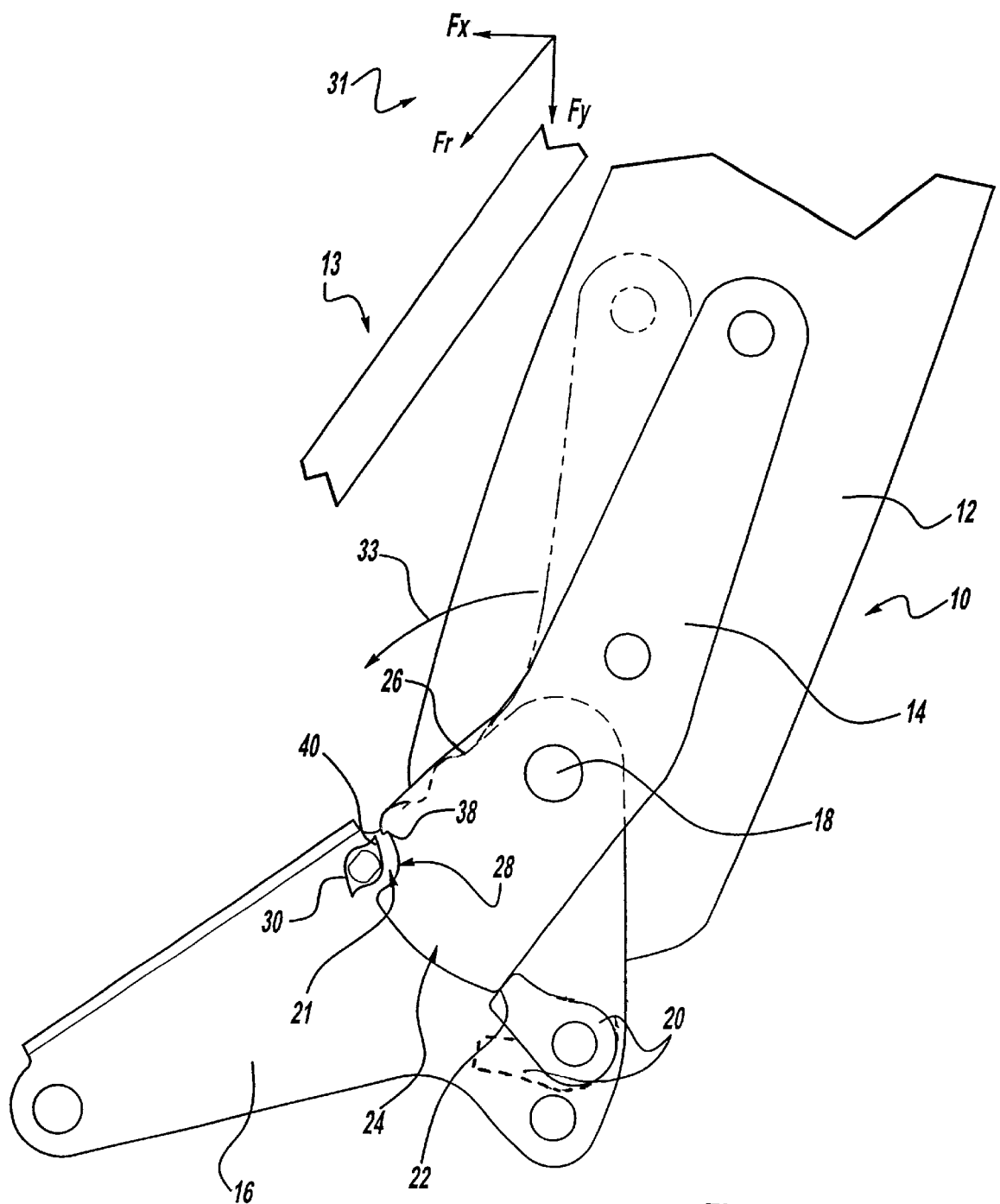
FIG. 1 is a diagrammatic view of the latch mechanism according to the preferred embodiment of the present invention, shown in a latched position.
Figure 2:
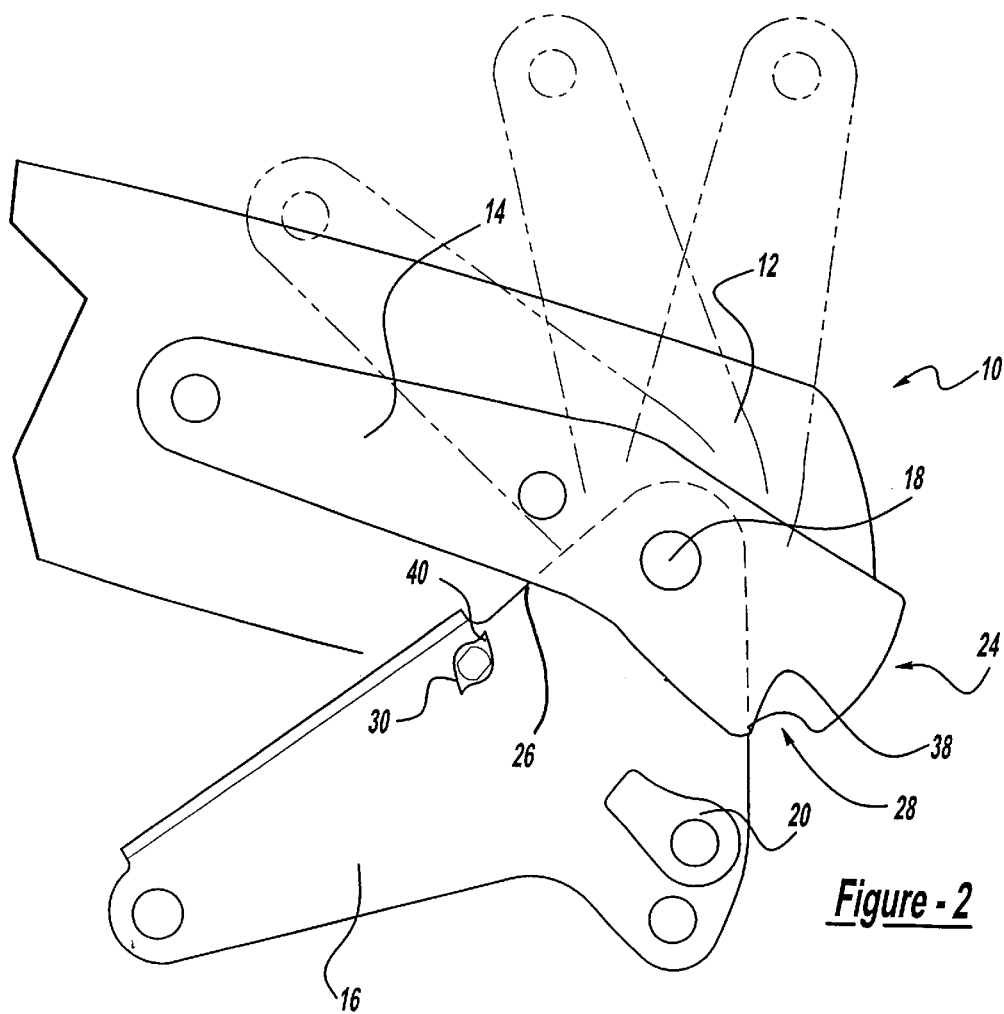
FIG. 2 is diagrammatic view of the latch mechanism in FIG. 1, shown in an unlatched position.

FIGS. 1 and 2 are enlarged views of a latch mechanism 10 of the present invention connected to a seat assembly having a seat back 12. The seat back 12 may be configured with an integral seat belt 13 such as a three point restraint. FIG. 1 depicts the latch mechanism 10 in a latched position and FIG. 2 depicts the latch mechanism 10 in an unlatched position. The latch mechanism 10 includes a sector support 14 for supporting the seat back 12. The sector support 14 is generally L-shaped, where the top of the L-shape supports the seat back 12 and the bottom of the L-shape includes an engagement surface 28 further discussed below. The sector support 14 is pivotably coupled to a base plate 16 at a pivot point 18 to allow the seat back 12 to pivot, as seen in FIG. 2. The seat back 12, via the sector support 14, may pivot about the pivot point 18 from a vertical use or seat forming position to a horizontal position folded upon a seat cushion. A rotatable cam or catch 20 is used to latch the seat back 12 in a seat forming position and unlatch the seat back 12, as the rotatable cam 20 is rotated by an occupant or user, as shown in phantom in FIGS. 1 and 2. The rotatable cam 20 is actuated by a handle (not shown) accessible to the occupant on the exterior of the latch mechanism 10. Sufficient area 21 is left between the engagement surface 28 and the stop 30 to allow rotation of the sector support 14 and seat back 12 to a horizontal position.

In the unlatched position, as seen in FIG. 2, the seat back 12 may be placed in a horizontal position, forming a flat storage surface and allowing access to the rear of the seat back 12. The rotatable cam 20 includes a substantially flat contact surface 22 which couples and decouples with a substantially flat contact surface on a first end 24 of the sector support 14 to latch or unlatch the seat back 12 in a seat forming position. The sector support 14 and base plate 16 may be made of steel, aluminum, a polymeric material, a composite material, or any other material with sufficient strength to support a vehicle seat assembly. The base plate 16, in the preferred embodiment, is fixed to the floor pan of a vehicle.

The sector support 14, as previously discussed, is L-shaped and includes the engagement surface 28 on the bottom portion of the L-shape. The engagement surface 28 has been designed to mate with a stop 30 fixed on the base plate 16 when a buckle zone 26 on the base plate 16 compresses or deflects under an external force. As seen in FIG. 1 in phantom, the buckle zone 26 will deflect and pivot the engagement surface 28 into contact with the stop 30 when an external force vector 31 of sufficient magnitude is applied to the sector support 14 (such as the force generated by a frontal collision). The area 21 between the engagement surface 28 and the stop 30 will be eliminated as the buckle zone 26 deflects.

The buckle zone 26 serves the dual purpose of energy absorption and guidance of the seat back 12. The sector support 14, via the buckle zone 26 in a deflection mode, will pivot about the contact surface 22 on the rotatable cam 20. This sector support 14 in conjunction with the rotatable cam 20 will fix a radial or arcuate deflection path, shown by arrow 33 in FIG. 1, that forces the engagement surface 28 of the sector support 14 into contact with the stop 30 to substantially prevent further motion of the seat back 12 in a forward direction. In the preferred embodiment of the present invention, the engagement surface 28 has a cammed surface with an indentation 38 to mate with projections or prongs 40 on the stop 30. The indentations 38 will guide and mate with the projections 40 of the stop 30 to create a snug or firm fit, acting as a catch to stop the movement of the sector support 14 during the pivoting of the sector support 14, as the buckle zone 26 deflects.

Figure 3:
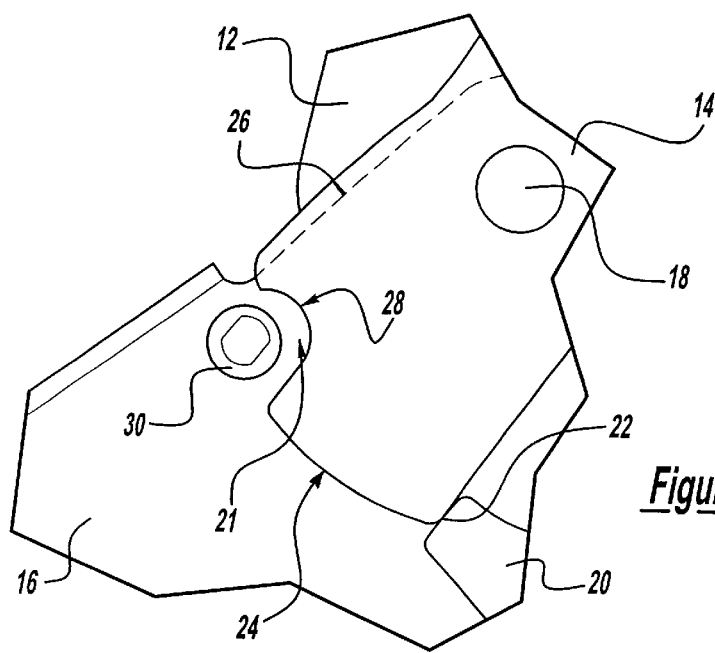
FIG. 3 is an enlarged view of an alternate embodiment of a stop and engagement surface of a sector support.
Figure 4:
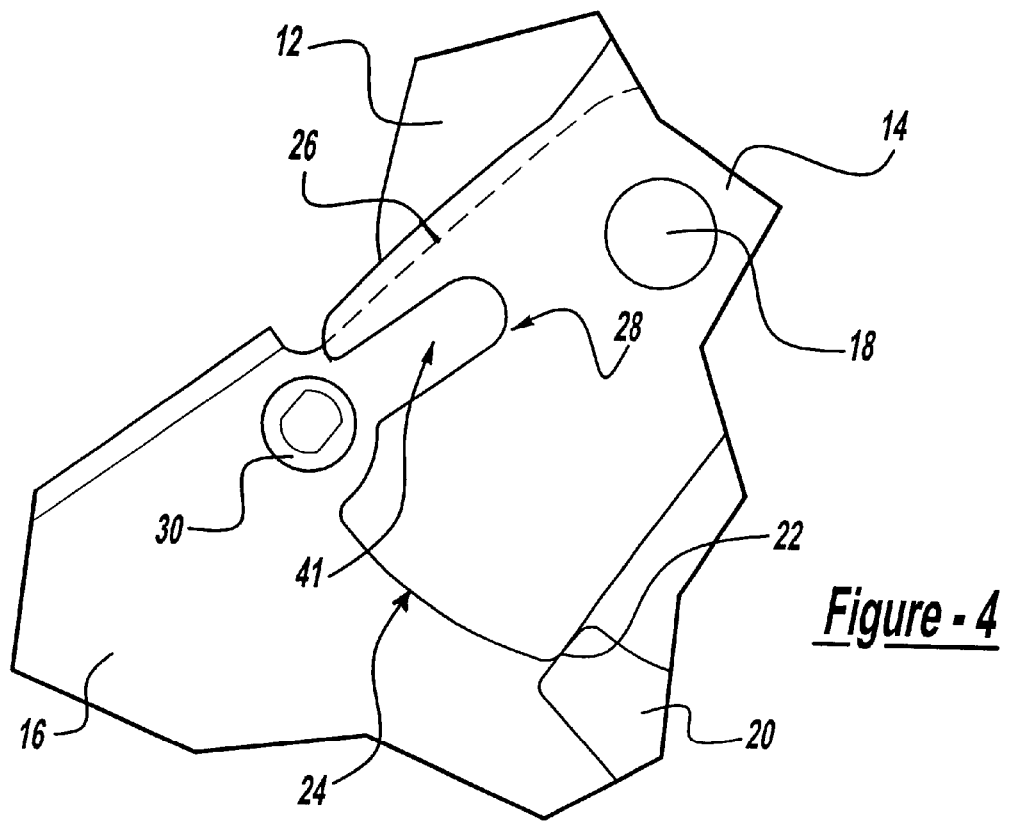
FIG. 4 is an enlarged view of a further embodiment of a stop and engagement surface of a sector support.

In an alternate embodiment of the present invention seen in FIG. 3, the stop 30 is a simple pin and the engagement surface 28 is profiled to couple with the stop 30, but any other similar radial stops 30 and engagement surfaces 28 are considered within the scope of the present invention.

In a further embodiment of the present invention the engagement surface 28 may be configured as a slot 41 having a smaller width than the diameter of the stop 30. The stop 30, during deflection of the buckle zone 26, will enter the slot 41 and deflect the sides of the slot 41 to absorb energy until the stop 30 reaches the end of the slot.

It is to be understood that the invention is not limited to the exact construction illustrated and described above, but that various changes and modifications may be made without departing from the spirit and scope of the inventions as defined in the following claims.

I claim:

1. A seat assembly comprising:
   a seat back operable to be displaced between a seat forming position and a stowed position;
   a latch mechanism providing support for said seat back, said latch mechanism comprising a support member having an engagement surface and a base plate having a stop, wherein said base plate includes a buckle zone, said buckle zone able to deflect under a force from a collision or rapid deceleration such that said engagement surface contacts said stop, said latch mechanism further comprises a rotatable cam to latch said support member and said seat back in said seat forming position, said engagement surface is profiled to mate with said stop, and wherein said stop includes at least one projection that couples to at least one indentation in said engagement surface when said buckle zone deflects.

2. The seat assembly of claim 1 wherein said buckle zone fixes the path of said support member during deflection of said buckle zone.

3. The seat assembly of claim 2 wherein as said buckle zone deflects, a sector support will pivot about a rotatable cam to bring said engagement surface into contact with said stop.

4. The seat assembly of claim 1 wherein said seat back includes an integral seat belt.

5. The seat assembly of claim 4 wherein said integral seat belt is a three point restraint.

6. The seat assembly of claim 1 wherein said buckle zone absorbs energy as it deflects.

7. A latch mechanism for a seat assembly having a seat back, said latch mechanism comprising:
   a base member having a stop;
   a sector support having a profiled surface, said sector support supporting the seat back and pivotably coupled to said base member;
   a buckle zone located in said base member, wherein said buckle zone compresses under a force from a collision or rapid deceleration, bringing said profiled surface into contact with said stop, substantially preventing movement of the seat back, the latch mechanism further comprises a rotatable catch to latch said sector support and the seat back in a seat forming position, and wherein said stop includes projections which couple to at least one indentation in said profiled surface.

8. The seat assembly of claim 7 wherein said buckle zone fixes the path of the sector support during compression.

9. The seat assembly of claim 8 wherein as said buckle zone compresses, said sector support will pivot about a rotatable catch to bring said engagement surface into contact with said stop.

10. The seat assembly of claim 7 wherein said seat back includes an integral seat belt.

11. The seat assembly of claim 7 wherein said integral seat belt is a three point restraint.

12. The seat assembly of claim 7 wherein said profiled surface is a slot.

\* \* \* \* \*